No. 892,087. PATENTED JUNE 30, 1908.
J. A. REY.
REFLECTOR FOR SEARCH LIGHTS.
APPLICATION FILED DEC. 15, 1905.
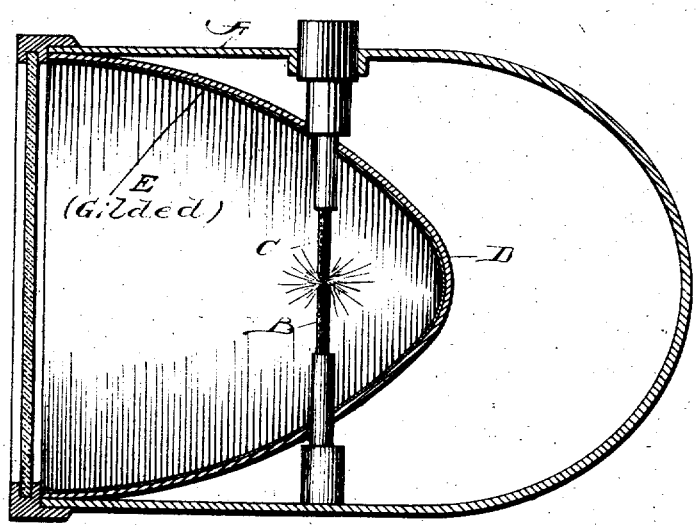

UNITED STATES PATENT OFFICE.

JEAN ALEXANDRE REY, OF PARIS, FRANCE.

REFLECTOR FOR SEARCH-LIGHTS.

No. 892,087.      Specification of Letters Patent.      Patented June 30, 1908.

Application filed December 15, 1905. Serial No. 291,951.

*To all whom it may concern:*

Be it known that I, JEAN ALEXANDRE REY, of 26 Avenue de Suffren, Paris, France, engineer, have invented a new and useful Improvement in Reflectors for Search-Lights, which improvement is fully set forth in the following specification.

This invention has for its object a mirror formed of gilded metal for reflecting the light of an electric arc to a distance which secures the maximum useful effect, that is to say, for a given expenditure of electric energy the maximum visibility of the objects illuminated. For this purpose the first condition to be fulfilled is to obtain a concentrated beam, any dispersion of the luminous rays being avoided. At the present time there are numerous lanterns which satisfy this purely geometrical condition, the spherical aberration of the reflecting surfaces being small enough for the concentration at a distance to be sufficient for practical purposes. In addition to this condition, the present invention fulfils two other very important conditions which greatly increase visibility. The first consists in giving to the beam a color approaching that of solar light. The human eye is best suited for seeing objects in daylight and to make objects visible to it, it is best that they should be illuminated with a light having a general tint approaching that of the solar rays. This condition has not hitherto been attained in electric arc lanterns. The light of the electric arc is in fact richest in blue and violet rays, that is to say, in rays whose ray lengths are least, and such light is therefore far removed in its properties from day-light, and is far from fulfilling the above condition. It has before been proposed in public arc lighting that the carbons should contain mineral substances which give to the light a yellow color in place of a violet color. The use of such carbons in a lantern allows a colored ray to be obtained, having a tint approaching more nearly to daylight. This solution of the problem leads however to various difficulties and this invention attains the same result by different means. The second condition to be fulfilled consists in employing a light whose rays are only slightly absorbed by the atmosphere or at most, to a less degree than are luminous rays of the ordinary arc. Light rich in yellow and orange rays fulfils this condition. It is known that the atmosphere principally absorbs the more refrangible rays, that is to say, the blue and violet rays, and that it absorbs to a much smaller extent the red, orange and yellow rays. The best proof of this is that all long distance lights, such as lighthouse or search lights become reddish at a sufficient distance from the source of light. Hitherto, in electric lanterns, only silvered glass mirrors have been employed, the silver being deposited by chemical means upon the glass. The principal reason for this is first the ease with which this metal is deposited upon the glass and second its great reflecting power which is greater than that of any other metal. The reflecting power of silver is however practically the same for all the wave length of the spectrum, and it follows that silver does not itself color the beam which it reflects thus the electric arc light reflected by lantern having a silvered glass mirror, is blueish, that is to say, is rich in blue and violet rays, for these are exactly the rays which are most prominent in the ordinary electric arc.

This invention overcomes these defects and complies with all the conditions enumerated above by the use of a mirror covered with a reflecting metal which is gold instead of silver. Gilded reflectors have been known from the earliest times but they have never been employed in electric lanterns.

Experience has shown that a gilded mirror in reflecting the beam of the electric arc, gives it a much warmer yellowish tint than a silvered reflector; objects illuminated by such beam have much more nearly the appearance of objects illuminated by solar rays and their visibility is considerably increased owing to this. Moreover, a beam coming from a mirror of this nature loses a smaller proportion of its intensity in passing through an atmospheric layer of a given thickness than a beam derived from a silvered mirror. The reflecting power of gold for the wave lengths corresponding to the less refrangible portion of the spectrum, that is to say, from red to yellow is besides practically the same as that of silver. The reflecting power of gold is also considerably less than that of silver for rays from yellow to violet, but these are precisely the rays which the atmosphere absorbs most easily. It may be said therefore that the total light reflected by a gilded mirror will be less than the light reflected by a silvered mirror, but that a greater proportion of this light will reach the object and consequently that the total useful effect will remain as high.

The coloration of the objects being more satisfactory to the eye, it is not to be wondered at that the visibility, which is the ultimate result it is desired to obtain, should be increased.

In the accompanying drawing I have shown for purposes of illustration a search light in a casing A, with the usual electrodes B and C, and employing a reflector D having its surface E gilded in accordance with this invention.

The gilded metal mirror forming the subject of this invention may be manufactured by any of the processes hitherto employed for the manufacture of metal reflectors; it may be formed of metal plated with gold, or metal gilded by electrolysis, and then suitably burnished and polished. The Cowper Coles process may be employed to construct the reflector. This process consists in chemically depositing upon a suitably shaped and polished parabolic glass mold, a thin layer of silver which is then covered with an electrolytic deposit of copper, thus forming the body of the reflector. On separating the reflector from the glass mold on which it is formed, a reflector is obtained whose curvature is rigorously exact and which has fine reflecting power. The silvered mirror obtained is then covered by electrolysis with a layer of gold which is then suitably polished, the silver only serving to support the gold. This process makes it possible to manufacture a reflector having the exactitude desired, the reflecting metal of which is gold and not silver and which fulfils all the conditions indicated above. The gold may moreover be replaced by any other metal having similar properties. The method of manufacturing these reflectors is not limited to a parabolic form, but it is equally applicable to any concave metallic surface formed to a hyperbolic or elliptic curve by any mechanical process, the metallic mass being covered with a layer of gold and suitably polished. The mirror above described has moreover the advantage of preventing all possible alteration to the reflecting surface, the gold not being attacked by the electric arc.

Having now particularly described and ascertained the nature of my said invention and in what manner the same is to be performed, I declare that what I claim is:

1. The combination with an electric arc lamp, of a reflector having its reflecting surface of gold.

2. The combination with an electric arc lamp, of a paraboliform reflector having its reflecting surface of gold.

3. A search-light comprising an electric arc and reflecting means to protect the light in substantially parallel rays, said means having its reflecting surface of polished gold.

In testimony whereof I have signed this specification in the presence of two subscribing witnesses.

JEAN ALEXANDRE REY.

Witnesses:
FREDERIC W. CAULDWELL,
GASTON DE MESTRAL.

---

Correction in Letters Patent No. 892,087.

It is hereby certified that in Letters Patent No. 892,087, granted June 30, 1908, upon the application of Jean Alexandre Rey, of Paris, France, for an improvement in "Reflectors for Search-Lights," an error appears in the printed specification requiring correction, as follows: In line 64, page 2, the word "protect" should read *project;* and that the said Letters Patent should be read with this correction therein that the same may conform to the record of the case in the Patent Office.

Signed and sealed this 21st day of July, A. D., 1908.

[SEAL.]

E. B. MOORE,
*Commissioner of Patents.* tion of this light will reach the object and consequently that the total useful effect will remain as high.

The coloration of the objects being more satisfactory to the eye, it is not to be wondered at that the visibility, which is the ultimate result it is desired to obtain, should be increased.

In the accompanying drawing I have shown for purposes of illustration a search light in a casing A, with the usual electrodes B and C, and employing a reflector D having its surface E gilded in accordance with this invention.

The gilded metal mirror forming the subject of this invention may be manufactured by any of the processes hitherto employed for the manufacture of metal reflectors; it may be formed of metal plated with gold, or metal gilded by electrolysis, and then suitably burnished and polished. The Cowper Coles process may be employed to construct the reflector. This process consists in chemically depositing upon a suitably shaped and polished parabolic glass mold, a thin layer of silver which is then covered with an electrolytic deposit of copper, thus forming the body of the reflector. On separating the reflector from the glass mold on which it is formed, a reflector is obtained whose curvature is rigorously exact and which has fine reflecting power. The silvered mirror obtained is then covered by electrolysis with a layer of gold which is then suitably polished, the silver only serving to support the gold. This process makes it possible to manufacture a reflector having the exactitude desired, the reflecting metal of which is gold and not silver and which fulfils all the conditions indicated above. The gold may moreover be replaced by any other metal having similar properties. The method of manufacturing these reflectors is not limited to a parabolic form, but it is equally applicable to any concave metallic surface formed to a hyperbolic or elliptic curve by any mechanical process, the metallic mass being covered with a layer of gold and suitably polished. The mirror above described has moreover the advantage of preventing all possible alteration to the reflecting surface, the gold not being attacked by the electric arc.

Having now particularly described and ascertained the nature of my said invention and in what manner the same is to be performed, I declare that what I claim is:

1. The combination with an electric arc lamp, of a reflector having its reflecting surface of gold.

2. The combination with an electric arc lamp, of a paraboliform reflector having its reflecting surface of gold.

3. A search-light comprising an electric arc and reflecting means to protect the light in substantially parallel rays, said means having its reflecting surface of polished gold.

In testimony whereof I have signed this specification in the presence of two subscribing witnesses.

JEAN ALEXANDRE REY.

Witnesses:
FREDERIC W. CAULDWELL,
GASTON DE MESTRAL.

---

Correction in Letters Patent No. 892,087.

It is hereby certified that in Letters Patent No. 892,087, granted June 30, 1908, upon the application of Jean Alexandre Rey, of Paris, France, for an improvement in "Reflectors for Search-Lights," an error appears in the printed specification requiring correction, as follows: In line 64, page 2, the word "protect" should read *project;* and that the said Letters Patent should be read with this correction therein that the same may conform to the record of the case in the Patent Office.

Signed and sealed this 21st day of July, A. D., 1908.

[SEAL.]

E. B. MOORE,
*Commissioner of Patents.*

Correction in Letters Patent No. 892,087.

It is hereby certified that in Letters Patent No. 892,087, granted June 30, 1908, upon the application of Jean Alexandre Rey, of Paris, France, for an improvement in "Reflectors for Search-Lights," an error appears in the printed specification requiring correction, as follows: In line 64, page 2, the word "protect" should read *project*; and that the said Letters Patent should be read with this correction therein that the same may conform to the record of the case in the Patent Office.

Signed and sealed this 21st day of July, A. D., 1908.

[SEAL.]

E. B. MOORE,
*Commissioner of Patents.*